United States Patent [19]

Uchizaki

[11] Patent Number: 4,981,626

[45] Date of Patent: Jan. 1, 1991

[54] METHOD OF FORMING DENSE CONCRETE SURFACE LAYER

[75] Inventor: Iwao Uchizaki, Tokyo, Japan

[73] Assignee: Takenaka Corporation, Japan

[21] Appl. No.: 504,862

[22] Filed: Apr. 5, 1990

[30] Foreign Application Priority Data

Nov. 2, 1989 [JP] Japan .................................. 1-284766

[51] Int. Cl.[5] ........................... B06B 3/00; B28B 1/08; B32B 31/14; E04B 1/16

[52] U.S. Cl. ......................................... 264/23; 264/34; 264/35; 264/69; 264/133; 264/139; 264/162; 264/163; 264/256; 264/333; 404/72; 404/75

[58] Field of Search .................................... 264/33-35, 264/139, 133, 69, 72, 256, 333, 162, 163, 23; 404/72, 75, 102, 113

[56] References Cited

U.S. PATENT DOCUMENTS

| | | | |
|---|---|---|---|
| 2,999,432 | 9/1961 | Ytterberg | 404/72 |
| 3,270,113 | 8/1966 | Longinotti | 264/333 X |
| 4,134,956 | 1/1979 | Suzuki et al. | 264/256 |
| 4,275,110 | 6/1981 | Margerie | 264/256 X |
| 4,398,842 | 8/1983 | Hodson | 404/75 X |

FOREIGN PATENT DOCUMENTS 64-44705 2/1989 Japan .

OTHER PUBLICATIONS

Compaction of Cement Mixture by Using Ultrasonic Waves Vibrations—author: Iwao Uchizaki, Japan Concrete Industrial Society Yearly Essay Reports, 1989, vol. -11-2, pp. 679-682.

Dry Shakes for Floors—What they will do for Slabs on Grade, and How to Use Them—Concrete Construction/ Mar. 1984.

*Primary Examiner*—Jan H. Silbaugh
*Assistant Examiner*—Karen D. Kutach
*Attorney, Agent, or Firm*—Oliff & Berridge

[57] ABSTRACT

After a mortar layer is formed on the surface layer of placed concrete, an ultrasonic vibrator is caused to vibrate while being pressed against the mortar layer surface, and a thin surface layer is scraped off, obtaining a dense water-shielding layer. Mortar with a low water-cement ratio is spread onto the surface of the water-shielding layer, and adhesion between the mortar and the water-shielding layer is strengthened by using the ultrasonic vibrator. The pressing force of the ultrasonic vibrator is then increased to make the mortar and the water-shielding layer densely integrated together, thereby forming a hard concrete surface excelling in abrasion resistance.

22 Claims, 2 Drawing Sheets

METHOD OF FORMING DENSE CONCRETE SURFACE LAYER

BACKGROUND OF THE INVENTION

1. Field of the Invention

The present invention relates to a method of forming a dense layer on a concrete surface such as a concrete floor or the like.

2. Description of the Prior Art

In a known method of forming a dense concrete surface, cement paste or mortar having a low water-cement ratio of 15%–23% is placed on a base plate, and the cement paste or mortar is pressed and spread by using an ultrasonic vibrator. It is then left to stand, thereby forming a dense layer having a thickness of 1–3 mm (Japanese Patent Laid-Open No. 44705/1989.

In the above-described conventional method, the material used is cement paste or mortar having qualities of becoming spread and fluidized upon receiving ultrasonic vibrations. In the case of concrete in which coarse aggregates are mixed, a large amount of coarse aggregates exists in the vicinity of the surface of placed concrete, so that there is a problem in that a thick and dense layer cannot be formed on the concrete surface. In addition, in accordance with the conventional method, since cement paste or mortar is placed on the base plate and is pressed by means of an ultrasonic vibrator, there is the problem that the method cannot be applied directly to fieldwork where concrete is placed on a plate floor or on the ground as in the case of a road.

SUMMARY OF THE INVENTION

Accordingly, an object of the present invention is to provide a method of forming a dense concrete surface which makes it possible to form on a concrete surface a dense surface layer having excellent hardness and abrasion resistance even in the case of ground where there is no base plate therebelow, thereby overcoming the above-described drawbacks of the conventional art.

To this end, in accordance with the present invention, there is provided a method of forming a dense concrete surface layer, comprising: a first step of forming a mortar layer on the surface of placed concrete; a second step of moving an ultrasonic vibrator with the ultrasonic vibrator being pressed against the surface of the mortar layer formed in the first step, thereby scraping off a thin layer of the surface; a third step of spreading, onto the surface scraped in the second step, mortar with a low water-cement ratio sufficient not to allow the mortar to become fluidized, and causing the ultrasonic vibrator to move thereon, thereby compacting a mortar layer with the low water-cement ratio and strengthening adhesion between the mortar layer and the concrete; and a fourth step of moving the ultrasonic vibrator being pressed against the mortar layer formed in the third step, with a force greater than that for the third step.

In accordance with another aspect of the invention, after the aforementioned three steps are carried out, a fourth step is effected for repeating in a plurality of stages the movement of the ultrasonic vibrator with the ultrasonic vibrator being pressed against the mortar layer formed in the third step, with a greater force than that for the third step, the pressing force being sequentially made greater toward a higher stage.

DETAILED DESCRIPTION OF THE EMBODIMENT

Figure 1:
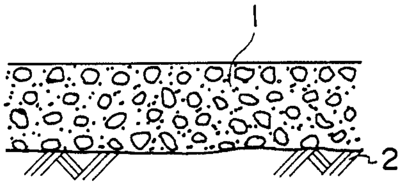
FIGS. 1–6 are step diagrams in cross-section, respectively illustrating the procedures of forming concrete in accordance with an embodiment of the present invention.
Figure 2:
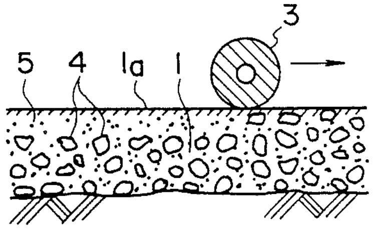

As a first step, as shown in FIG. 1, concrete 1 having a water-cement ratio of 45% is placed on the ground 2. Then, as shown in FIG. 2, while vibrations with a frequency of 100 Hz and an amplitude of 3 mm are being applied to a surface 1*a* of the concrete 1 by a vibrator 3 immediately after placement, the vibrator 3 is moved in the direction indicated by the arrow. The concrete is then left to stand for four hours. In this case, concrete with a water-cement ratio of 45%–55% may be used and, it is possible to use 200 Hz, and an amplitude of 1–5 mm, preferably 1–3 mm. The time duration when the mortar layer is left to stand may be set from 3–7 hours, preferably 3–5 hours. If the frequency and the amplitude are less than 100 Hz and 1 mm, respectively, as the conditions of vibrations, the vibrator necessary for forming an effective mortar layer becomes too large. On the other hand, if the frequency and the amplitude of vibrations are more than 200 Hz and 3 mm, respectively, problems are liable to occur in terms of the strength and durability of machine elements that make up the vibrator.

In the first step, coarse particles 4 in aggregate that are located on the concrete surface 1*a* are allowed to sink into the interior due to vibrations imparted by vibrator 3, thereby forming a mortar layer. After it is left to stand, the surface 1*a* becomes a damp-dry or partially dry mortar layer 5.

The standing time is determined in such a manner that the water-cement ratio of the surface of the mortar layer becomes 15–23% or thereabouts. In this case, it is preferred that the mortar be left to stand in a range in which the product of the standing time and the temperature is 100–400 hr.° C. In this case, it is most preferable that when the surface of the mortar layer 5 is measured with a surface pressure gauge, the surface pressure is approximately 1–5 kg/cm$^2$. At this time, the water-cement ratio of the mortar layer 5 is 15–23%. Incidentally, a study on the effect of the water-cement ratio (water content) on a dense layer revealed that no dense layer is observed in the water content of 5–10%. In addition, the dense layer begins to appear at 15%, increases sharply up to 23%, and suddenly thereafter, ceases to be formed. The reason for this is that if the water content ratio is small, compaction cannot take place and, if large, fluidized cement escapes between the frame and the ultrasonic vibrator. Changes in hardness which was used as an index of the quality were substantially fixed in the range of the water content of 15–23%, and in this range no major changes in the quality occur even if the thickness of the dense layer changes.

In the first step, the surface of the mortar layer 5 is in a state in which it has a substantially rough or irregular surface.

Figure 3:
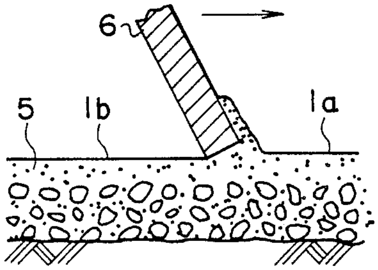

As a second step, as shown in FIG. 3, while an ultrasonic vibrator 6 with a frequency of 19.5 kHz and an amplitude of 5 $\mu$m is being applied to the mortar surface 5 with a pressure of 0.05 kg/cm$^2$, the ultrasonic vibrator 6 is moved at a velocity of 2.5 cm/sec. so as to scrape off the surface 1*a* thereof. In this case, the frequency of the ultrasonic vibrator may be set to 15–40 kHz, and its vibrating pressure to 0.05–0.1 kg/cm$^2$. It is preferred that the frequency be held within a physiologically allowable range of noise and the amplitude be set to a high level. If the frequency is lower than 15 kHz, the noise becomes very loud and the working environment becomes unbearable to the operator. Meanwhile, the higher the amplitude of an ultrasonic resonator (generally called a tool horn), the more advantageous it is. However, if the amplitude is made high, a large tensile force acts on a connecting portion between the tool horn and a piezoelectric ceramic made of lead zirconate titanate (electrostrictive element) which is an element for converting electric vibrations into mechanical vibrations. Its value becomes large in proportion linearly with the square of the frequency. For that reason, 40 kHz or thereabouts is a limit in order to secure an amplitude of 5 $\mu$m. On the other hand, if the vibrating pressure exceeds $p=0.1$ kg/cm$^2$ under the conditions of a moving velocity $v=2.5$ cm/sec. and an amplitude $A=5$ $\mu$m, the scraping capacity becomes too strong. Consequently, as the tool horn advances, the scraping thickness becomes gradually large, and the tool horn gradually sinks. Under the aforementioned conditions, if $p=0.05$ or below, the thickness of the dense layer is too small. In practice, it is preferred that the vibrating pressure be adjusted in the range of 0.05–0.1 kg/cm$^2$ in correspondence with the state of the mortar layer 5.

In the second step, by scraping off the surface 1*a* including a laitance by means of the ultrasonic vibrator 6, large surface irregularities are removed and a smooth surface is formed. Also, the mortar layer 5 is compacted, and a water-shielding layer 1*b* formed of a dense layer is thereby formed. In addition, the setting of the dense layer compacted by the ultrasonic vibrator is accelerated and dries speedily, so that the water-shielding effect becomes large.

The water-shielding layer 1*b* is designed to prevent water from moving up from the interior of the concrete below the water-shielding layer 1*b* to the surface at the time when third and fourth steps which will be described later are executed. In this respect, the thickness of the water-shielding layer 1*b* is preferably set to 3–5 mm or thereabouts.

Figure 4:
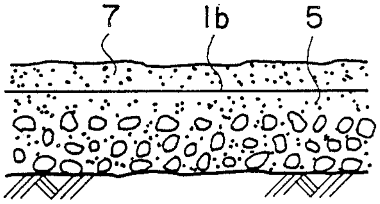

As a third step, as shown in FIG. 4, mortar layer 7 is spread onto the surface 1*b* having small irregularities of the mortar layer 5 in the second step at a rate of 7 kg/m$^2$. In this case, when mortar is in the form of paste, mortar is fluidized by a high vibrating pressure. However, fine sand is preferably mixed into the paste. If the fine sand is mixed into the mortar, the mortar is compacted by the ultrasonic vibrations and solidifies as a result, so that the vibrating force can be supported and propagated. As a preferable example of the mortar layer 7, it is possible to cite one in which, assuming that water is W, cement is C, and sand passing through a 0.6 mm-mesh sieve is S, W:C:S=0.2:1:1.6.

Figure 5:
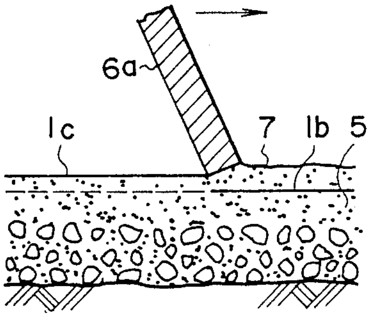

Subsequently, as shown in FIG. 5, while an ultrasonic vibrator 6*a* with a frequency of 19.5 kHz and an amplitude of 10 $\mu$m is being applied to the mortar layer 7 with a pressure of 0.1 kg/cm$^2$, the ultrasonic vibrator 6*a* is moved at a velocity of 2.5 cm/sec. so as to compact the mortar layer 7 and obtain a surface layer 1*c* having a fixed thickness, allowing the mortar layer 7 to adhere to the mortar layer 5. The frequency of the ultrasonic vibrator may be set in the range of 15 kHz–40 kHz; the amplitude, 5–15 $\mu$m; the vibrating pressure, 0.02–0.2 kg/cm$^2$; and the moving velocity 1.5–10 cm/sec., while the water-cement ratio of the mortar layer 7 may be set in the range of 15–28%. In this case, if the amplitude is smaller than 5 $\mu$m, the range of compaction is shallow, so that the adhesion with the mortar layer 5 becomes weak. Meanwhile, if the amplitude is greater than 5 $\mu$m, the compacting range of the mortar layer 7 becomes too deep, with the result that water oozes out from the mortar layer 5, and the mortar layer 7 becomes fluidized. Also, if the vibrating pressure is less than 0.02 kg/cm$^2$, the compacting range of the mortar layer 7 becomes shallow, while if greater than 0.2 kg/cm$^2$, there is the possibility of the ultrasonic vibrator carrying away the mortar layer 7. With respect to moving velocity, if the velocity is smaller than 1.5 cm/sec., the compacting range becomes too deep, water oozes out from the mortar layer 7, and execution efficiency declines. Meanwhile, if moving velocity is greater than 10 cm/sec., the compacting range becomes shallow.

In addition, by virtue of the vibration imparted from the ultrasonic vibrator, the mortar layer 7 with a low water-cement ratio becomes the surface layer 1*c* with a fixed thickness which is formed on the water-shielding layer 1*b* having small irregularities.

In a third step, the adhesion between the mortar layer 7 and the damp-dry mortar layer 5 is strengthened, so that even when high-pressure vibrations are applied to the mortar layer 7 by the ultrasonic vibrator in an ensuing step, the occurrence of exfoliations and cracks is prevented. In addition, if the vibrating pressure is made large, there is the possibility of the mortar layer 5 becoming exfoliated, so that the vibrating pressure is preferably set in the above-described range. Also, if the moving velocity is small, the ultrasonic vibrator 6*a* carries away the mortar layer 7.

Figure 6:
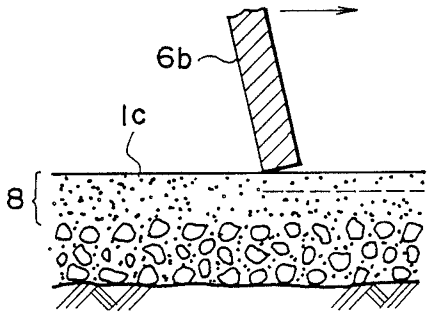

As a fourth step, as shown in FIG. 6, while an ultrasonic vibrator 6*b* with a frequency of 19.5 kHz and an amplitude of 10 $\mu$m is being applied to the water-shielding layer 1*c* of the mortar layer with a pressure of 0.9 kg/cm$^2$, the ultrasonic vibrator 6*b* is moved at a velocity of 2.5 cm/sec., thereby allowing the mortar layer 7 and the mortar layer 5 disposed therebelow to be integrated together and making the integrated layer denser.

The frequency of the ultrasonic vibrator may be set in the range of 15 kHz–40 kHz; the amplitude, 5–15 $\mu$m; the vibrating pressure, 0.6–1.5 kg/cm$^2$; and the moving velocity, 1.5–10 cm/sec. In this case, if the amplitude is smaller than 5 $\mu$m, and the vibrating pressure is smaller than 0.6 kg/cm$^2$, the compacting range becomes shallow, whereas if the amplitude is greater than 15 $\mu$m and the vibrating pressure is greater than 1.5 kg/cm$^2$, there is a large possibility of voids being produced in the layer which is to become the dense layer.

In the fourth step, the mortar layer 7 having a low water-cement ratio and the mortar layer 5 disposed above the concrete 1 are integrated by the ultrasonic vibrator 6*b*, a denser integrated layer can be obtained. Hence, a very dense layer 8 having a thickness of 1 cm or thereabouts is obtained. Since the adhesion between the mortar layer 7 and the damp-dry mortar layer is strengthened in the third step, and a denser integrated layer is obtained in the fourth step, the pressing force in the fourth step can be made greater than that in the third step.

Furthermore, in the fourth step, if the moving velocity of the ultrasonic vibrator 6b is large, the density of the mortar becomes insufficient, whereas if the moving velocity is small, the temperature of the mortar layer 7 increases, cavities occur, and water in the mortar layer 5 enter the mortar layer 7. Therefore, it is preferred that the moving velocity of the ultrasonic vibrator in the fourth step be set in the above-described range.

Although in the above-described embodiment concrete is placed on the ground, it goes without saying that the concrete may be placed on a base plate or a mold plate.

In the present invention, instead of the steps shown in FIGS. 1 and 2, after concrete is placed on the ground, the mortar 5 having a water-cement ratio of 15–23% may be sprayed onto the concrete surface, and the steps shown in FIGS. 3–6 may then be executed thereby obtaining a dense concrete surface.

Furthermore, in the present invention, if the steps shown in FIGS. 5 and 6 are repeated in a plurality of stages, the thickness of the dense mortar 8 can be further increased.

Figure 7:
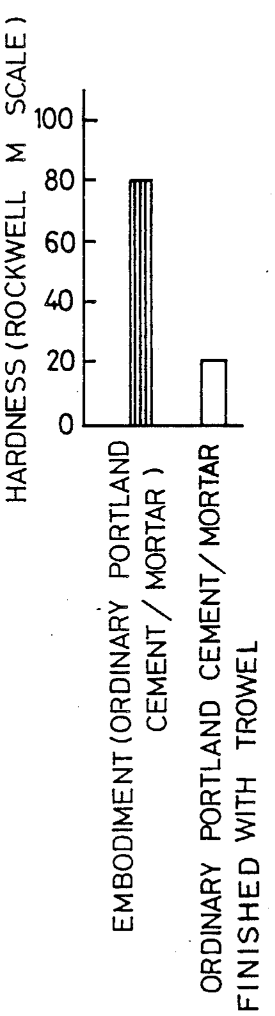
FIG. 7 is a bar graph illustrating the surface hardness of the concrete obtained in accordance with the method of the invention in comparison with a conventional example.
Figure 8:
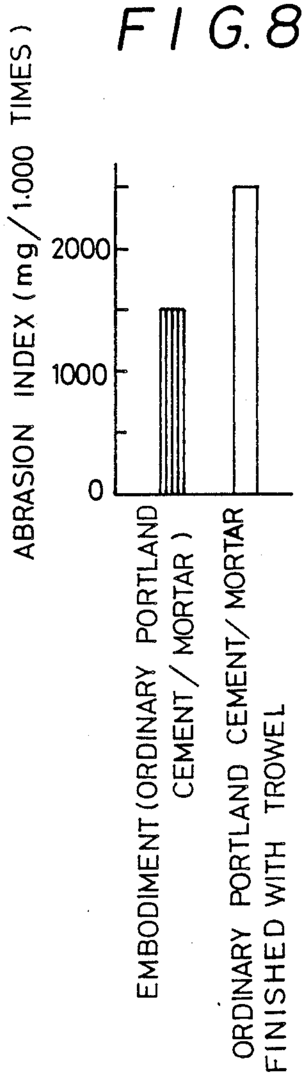
FIG. 8 is a bar graph illustrating the abrasion resistance of a concrete surface obtained in accordance with the method of the invention.

FIGS. 7 and 8 respectively show the results of measurement of the hardness of concrete surfaces in accordance with the embodiment and a conventional example, and the results of measurement of abrasion indices thereof using a Taber's abrasion resistance tester.

As the conventional example, a test was similarly conducted on mortar finished with a trowel.

EXAMPLE A:

Conditions for the First Step

| | |
|---|---|
| Water-cement ratio | W/C = 50% |
| Frequency | 100 Hz |
| Amplitude | 3 mm |

Vibrated immediately after placement

Conditions for the Second Step

| | |
|---|---|
| Frequency | 19.5 kHz |
| Amplitude | 5 μm |
| Vibrating pressure | 0.05 kg/cm$^2$ |
| Moving velocity | 2.5 cm/sec. |
| Standing time | 4 hrs. |

Conditions for the Third Step

| | |
|---|---|
| Amount of mortar sprayed | 7 kg/m$^2$ |
| (Thickness of mortar 7 | approx. 3 mm) |
| Frequency | 19.5 kHz |
| Amplitude | 10 μm |
| Vibrating pressure | 0.1 kg/cm$^2$ |
| Moving velocity | 2.5 cm/sec. |

Conditions for the Fourth Step

| | |
|---|---|
| Frequency | 19.5 kHz |
| Amplitude | 10 μm |
| Vibrating pressure | 0.9 kg/cm$^2$ |

-continued

| | |
|---|---|
| Moving velocity | 2.5 cm/sec. |

As is apparent from FIGS. 7 and 8, the concrete surface in accordance with the present invention has a far greater hardness as compared with that of the conventional example and has outstanding abrasion resistance as well. It should be noted that in the above-described embodiment if hard aggregates formed of, for example, a metal or a mineral are mixed into the mortar layer 7, the abrasion resistance can be improved further. In the present invention, any type of vibrator can be used through the first step to fourth step.

What is claimed is:

1. A method for forming a dense concrete surface layer on placed concrete having a surface, comprising:

a first step of forming a first mortar layer having a surface on said surface of said placed concrete:

a second step of forming a water-shielding layer in said first mortar layer by moving an ultrasonic vibrator on said surface of said first mortar layer, with said ultrasonic vibrator being pressed against said surface of said mortar layer formed in said first step to thereby scrape off a thin layer of said surface of said first mortar layer;

a third step of spreading mortar onto said water-shielding layer formed in said second step thereby forming a second mortar layer, said mortar having a low water-cement ratio sufficient not to allow said mortar to become fluid-like, and causing said ultrasonic vibrator to move on said second mortar layer, thereby compacting said second mortar layer and strengthening adhesion between said second mortar layer and said water-shielding layer of said first mortar layer on said surface of said placed concrete, such that during ensuing vibrations occurrence of exfoliation and cracks in said first and second mortar layers is prevented; and a fourth step of moving said ultrasonic vibrator on said second mortar layer, said ultrasonic vibrator being pressed against said second mortar layer formed in said third step with a greater force than that for said third step thereby integrating said second mortar layer with said first mortar layer to form a denser integrated layer on said surface of said placed concrete.

2. A method of forming a dense concrete layer according to claim 1, wherein said first step said concrete is placed on the ground.

3. A method of forming a dense concrete surface layer according to claim 1, wherein in said first step a mortar is formed on said surface of said placed concrete when coarse aggregates of said placed concrete are submerged in said placed concrete by applying vibrations to said surface of said placed concrete, and said mortar is then left to stand until a damp-dry mortar layer is formed.

4. A method of forming a dense concrete surface layer according to claim 1, wherein in said first step mortar is spread onto said surface of said placed concrete to form said first mortar layer.

5. A method of forming a dense concrete surface layer according to claim 1, wherein said ultrasonic vibrator in said second step vibrates under the conditions of a frequency of 15–40 kHz and a vibrating pressure of 0.05–0.1 kg/cm$^2$.

6. A method of forming a dense concrete surface layer according to claim 1, wherein in said second step said water-shielding layer has a depth of 3-5 mm.

7. A method of forming a dense concrete surface layer according to claim 1, wherein the water-cement ratio of the mortar in said third step is 15–28%.

8. A method of forming a dense concrete surface layer according to claim 1, wherein said ultrasonic vibrator in said third step vibrates under the conditions of a frequency of 15–40 kHz, an amplitude of 5–15 $\mu$m, and a vibrating pressure of 0.02–0.2 kg/cm$^2$.

9. A method of forming a dense concrete surface layer according to claim 1, wherein said ultrasonic vibrator in said third step moves on said second mortar layer at a rate of 1.5–10 cm/sec.

10. A method of forming a dense concrete surface layer according to claim 1, wherein said ultrasonic vibrator in said fourth step vibrates under the conditions of a frequency of 15–40 kHz, an amplitude of 5–15 $\mu$m, and a vibrating pressure of 0.06–1.5 kg/cm$^2$.

11. A method of forming a dense concrete surface layer according to claim 1, wherein said ultrasonic vibrator in said fourth step moves at a velocity of 1.5–10 cm/sec.

12. A method of forming a dense concrete surface layer according to claim 3, wherein concrete with a water-cement ratio of 45–55% is placed.

13. A method of forming a dense concrete surface layer according to claim 3, wherein said damp-dry mortar layer is formed with a water-cement ratio of 15–23%.

14. A method of forming a dense concrete surface layer according to claim 3, wherein during said first step vibrations are applied to said surface of said placed concrete with a vibrator, and said vibrator is vibrated under the conditions of a frequency of 50–200 Hz and an amplitude of 1–5 mm.

15. A method of forming a dense concrete surface layer according to claim 3, wherein during said first step said mortar is left to stand in a range in which the product of the standing time and temperature of said mortar is 100–400 hr.C.

16. A method of forming a dense concrete surface layer on placed concrete having a surface, comprising:

a first step of forming a first mortar layer having a surface on said surface of said placed concrete;

a second step of forming a water-shielding layer in said first mortar layer by moving an ultrasonic vibrator on said surface of said first mortar layer, with said ultrasonic vibrator being pressed against said surface of said mortar layer formed in said first step to thereby scrape off a thin layer of said surface of said first mortar layer;

a third step of spreading mortar onto said water-shielding layer formed in said second step thereby forming a second mortar layer, said mortar having a low water-cement ratio sufficient not to allow said mortar to become fluid-like, and causing said ultrasonic vibrator to move on said second mortar layer, thereby compacting said second mortar layer and strengthening adhesion between said second mortar layer and said first mortar layer on said surface of said placed concrete, such that during ensuing vibrations occurrence of exfoliation and cracks in said first and second mortar layers is prevented; and a fourth step of repeating in a plurality of stages said movement of said ultrasonic vibrator on said second mortar layer, with said ultrasonic vibrator being pressed against said second mortar layer formed in said third step with a force greater than that for said third step, said pressing force being sequentially made greater toward a higher stage thereby integrating said second mortar layer with said first mortar layer to form a denser integrated layer on said surface of said placed concrete.

17. A method of forming a dense concrete surface layer according to claim 16, wherein said ultrasonic vibrator in said second step vibrates under the conditions of a frequency of 15–40 kHz and a vibrating pressure of 0.05–0.1 kg/cm$^2$.

18. A method of forming a dense concrete surface layer according to claim 16, wherein in said second step said water-shielding layer has a depth of 3-5 mm.

19. A method of forming a dense concrete surface layer according to claim 16, wherein the water-cement ratio of said mortar in said third step is 15–28%.

20. A method of forming a dense concrete surface layer according to claim 16, wherein said ultrasonic vibrator in said third step vibrates under the conditions of a frequency of 15–40 kHz, an amplitude of 5–15 $\mu$m, and a vibrating pressure of 0.02–0.2 kg/cm$^2$.

21. A method of forming a dense concrete surface layer according to claim 16, wherein said ultrasonic vibrator in said third step moves on said second mortar layer at a rate of 1.5–10 cm/sec.

22. A method of forming a dense concrete surface layer on placed concrete having a surface, comprising:

a first step of forming a first mortar layer having a surface on said surface of said placed concrete;

a second step of moving an ultrasonic vibrator on said first mortar layer, with said ultrasonic vibrator being pressed against said surface of said first mortar layer formed in said first step with a frequency of 15–40 kHz and a vibrating pressure of 0.05–0.1 kg/cm$^2$ to thereby scrape off a thin layer of said surface of said first mortar layer and form a water-shielding layer thereon;

a third step of spreading mortar with a water-cement ratio of 15–28% onto said water-shielding layer formed in said second step to form a second mortar layer, and moving said ultrasonic vibrator thereon with a frequency of 15–40 kHz, an amplitude of 5–15 $\mu$m, and a vibrating pressure of 0.02–0.2 kg/cm$^2$, thereby compacting said second mortar layer having a low water-cement ratio and strengthening adhesion between said second mortar layer and said first mortar layer on said surface of said placed concrete, such that during ensuing vibrations occurrence of exfoliation and cracks in said first and second mortar layers is prevented; and a fourth step of pressing said ultrasonic vibrator against said second mortar layer formed in said third step with a pressing force greater than that for said third step thereby integrating said second mortar layer with said first mortar layer to form a denser integrated layer on said surface of said placed concrete.

* * * * *